United States Patent

Kingdon et al.

Patent Number: 5,991,620
Date of Patent: Nov. 23, 1999

[54] POSITIONING BUSY INDICATOR AND QUEUING MECHANISM

[75] Inventors: Christopher H. Kingdon, Garland; Bagher R. Zadeh, Dallas; Maya Roel-Ng, Plano; Stephen Hayes, Carrollton, all of Tex.

[73] Assignee: Ericsson Inc., Research Triangle Park, N.C.

[21] Appl. No.: 08/978,959

[22] Filed: Nov. 26, 1997

[51] Int. Cl.$^6$ .................................................. H04Q 7/22
[52] U.S. Cl. ........................ 455/432; 455/440; 455/456; 455/458; 455/560; 455/517; 455/528
[58] Field of Search .................................... 455/432, 412, 455/433, 514, 517, 528, 566, 575, 95, 440, 456, 527, 458, 560; 379/67, 89, 133, 134, 215, 266, 277, 297, 309

[56] References Cited

U.S. PATENT DOCUMENTS

| | | | |
|---|---|---|---|
| 5,442,682 | 8/1995 | Svedin et al. | 379/59 |
| 5,519,760 | 5/1996 | Borkowski et al. | 379/59 |
| 5,802,475 | 9/1998 | Kishida et al. | 455/453 |
| 5,878,348 | 3/1999 | Foti | 455/434 |
| 5,884,179 | 3/1999 | Patel | 455/445 |
| 5,889,770 | 3/1999 | Jokiaho et al. | 455/440 |
| 5,907,805 | 5/1999 | Chotai | 455/414 |

FOREIGN PATENT DOCUMENTS

| | | |
|---|---|---|
| WO 92/10069 | 6/1902 | WIPO . |
| WO 95/26510 | 10/1995 | WIPO . |
| WO 96/01531 | 1/1996 | WIPO . |

OTHER PUBLICATIONS

PCT International Search Report dated Mar. 12, 1999.

Primary Examiner—Wellington Chin
Assistant Examiner—Simon Nguyen
Attorney, Agent, or Firm—Jenkens & Gilchrist, P.C.

[57] ABSTRACT

A telecommunications system and method is disclosed which avoids unwanted feature interactions while positioning a mobile station that was in idle mode when the positioning request was received by the network. When the serving MSC/VLR receives a request to collect positioning measurements for a mobile station that is in idle mode, the serving MSC/VLR will set an indicator associated with the subscriber to "busy for connection management due to positioning". This flag will allow the MSC/VLR to make a distinction between a positioning connection and the normal mark of "busy for connection management". Thereafter, when a mobile terminating call arrives to the MSC/VLR for a subscriber that is marked as "busy for connection management due to positioning", the MSC/VLR can place the incoming call in a queue until the positioning measurements are taken and the subscriber being positioned is put back in idle mode.

24 Claims, 4 Drawing Sheets ns Standards Institute (ETSI), was established in 1982 to
POSITIONING BUSY INDICATOR AND QUEUING MECHANISM

BACKGROUND OF THE PRESENT INVENTION

1. Field of the Invention

The present invention relates generally to telecommunications systems and methods for determining the location of a mobile terminal within a cellular network, and specifically to preventing interference with subscriber features during positioning of the mobile terminal.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLNN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS within a cellular network has recently become important for a wide range of applications. For example, positioning services may be used by transport and taxi companies to determine the location of their vehicles. In addition, for emergency calls, e.g., 911 calls, the exact location of the mobile terminal may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

As can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Mobile Positioning Center (MPC) 270 for calculation of the geographical location of the MS 200. The location of the MS 200 can then be sent to the application 280 within the cellular network 10 or external to the network 10 that requested the positioning. Alternatively, the requesting application 280 could be located within the MS 200 itself or in the network (MSC/VLR 260).

In order to accurately determine the location of the MS 200, positioning data from three or more separate Base Transceiver Stations (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle for any cellular system can be used, instead of the TA value discussed herein.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSS, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can be determined (with certain accuracy) by the Mobile Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

In order to collect this positioning data, e.g., TA values, the network 10 must be in radio contact with the MS 200. When the MS 200 to be positioned is in idle mode, the MSC/VLR 260 will instruct the serving BSS (220 and 240) to page the MS 200 in order to establish radio contact with the MS 200. The positioning measurements can then be taken before the MS 200 is alerted. Since the subscriber is unaware that his/her MS 200 is temporarily put into dedicated mode by the network 10 in order to collect the positioning measurements, the subscriber expects to be able to receive incoming calls. However, with existing technology, terminating features like call forwarding on no reply, call forwarding on busy and call waiting are invoked while the positioning measurements are taken. However, if the mobile was put in dedicated mode only to collect the positioning measurements, the subscriber would prefer to not invoke these terminating features.

It is therefore an object of the invention to avoid unwanted feature interactions while a mobile terminal is put into dedicated mode during positioning by placing all incoming calls in a queue until the mobile terminal becomes idle.

SUMMARY OF THE INVENTION

The present invention is directed to a telecommunications system and method which avoids unwanted feature interactions while positioning a mobile station that was in idle mode when the positioning request was received by the network. When the serving MSC/VLR receives a request to collect positioning measurements for a mobile station that is in idle mode, the serving MSC/VLR sets an indicator associated with the subscriber as "busy for connection management due to positioning". This flag will allow the MSC/VLR to make a distinction between a positioning connection and the normal indicator of "busy for connection management". Thereafter, when a mobile terminating call arrives to the MSC/VLR for a subscriber that is marked as "busy for connection management due to positioning", the MSC/VLR can queue the incoming call until the positioning measurements are taken and the subscriber being positioned is put back in idle mode.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
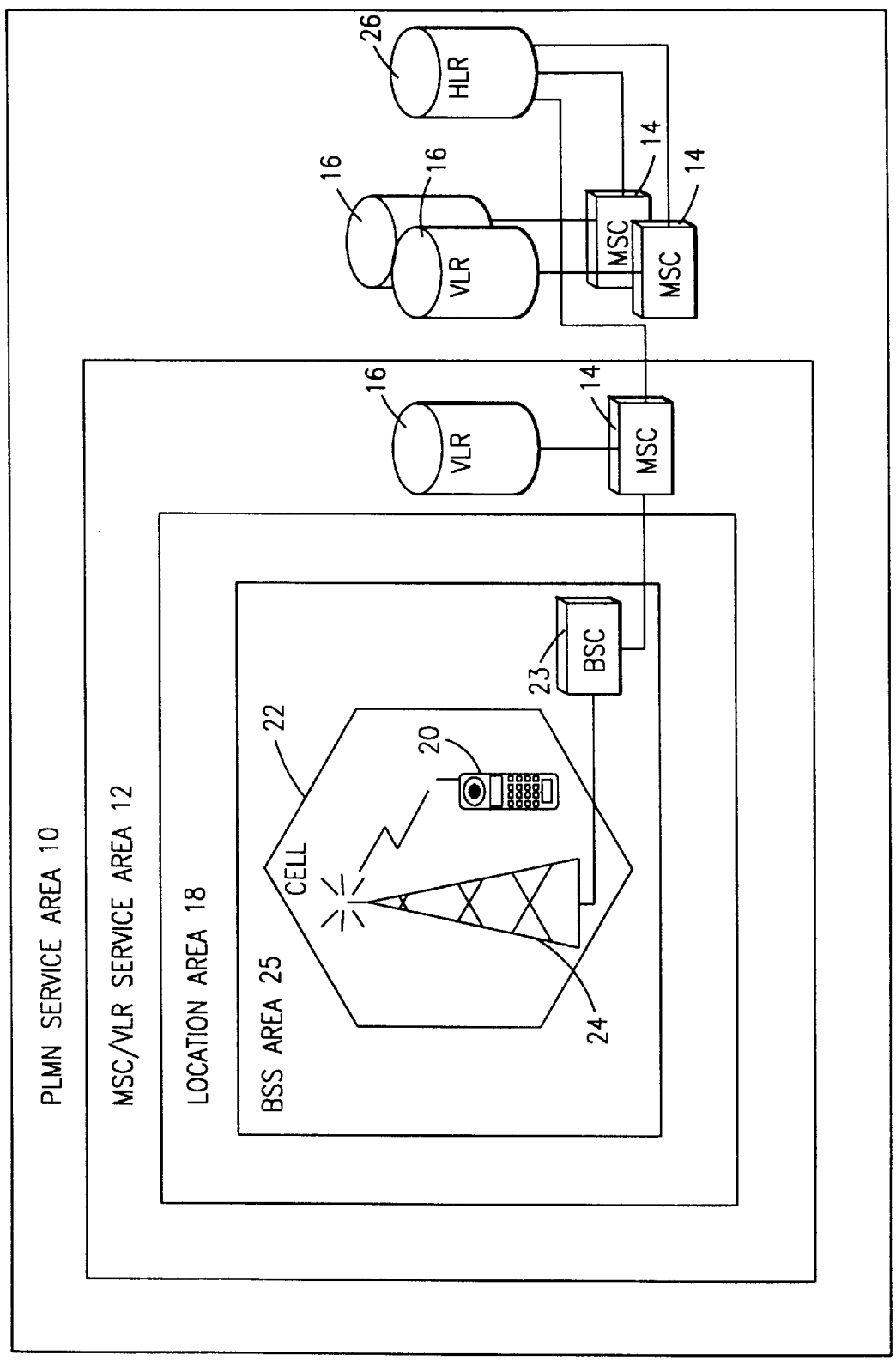
FIG. 1 is a block diagram of a conventional terrestrially-based wireless telecommunications system.
Figure 2:
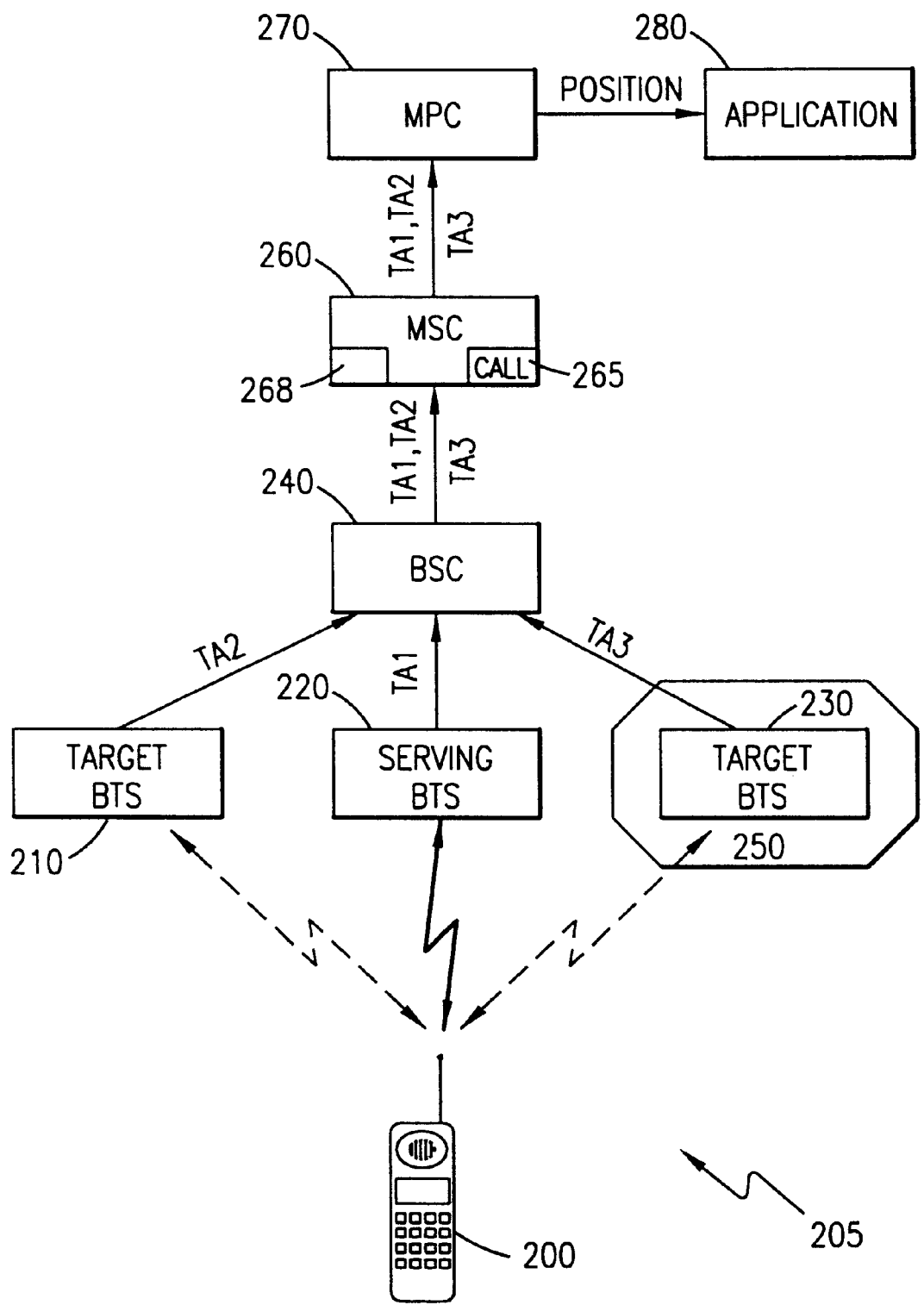
FIG. 2 illustrates a sample positioning handover in which positioning data is acquired by a target base transceiver station and transmitted to a serving base station controller.
Figure 3A:
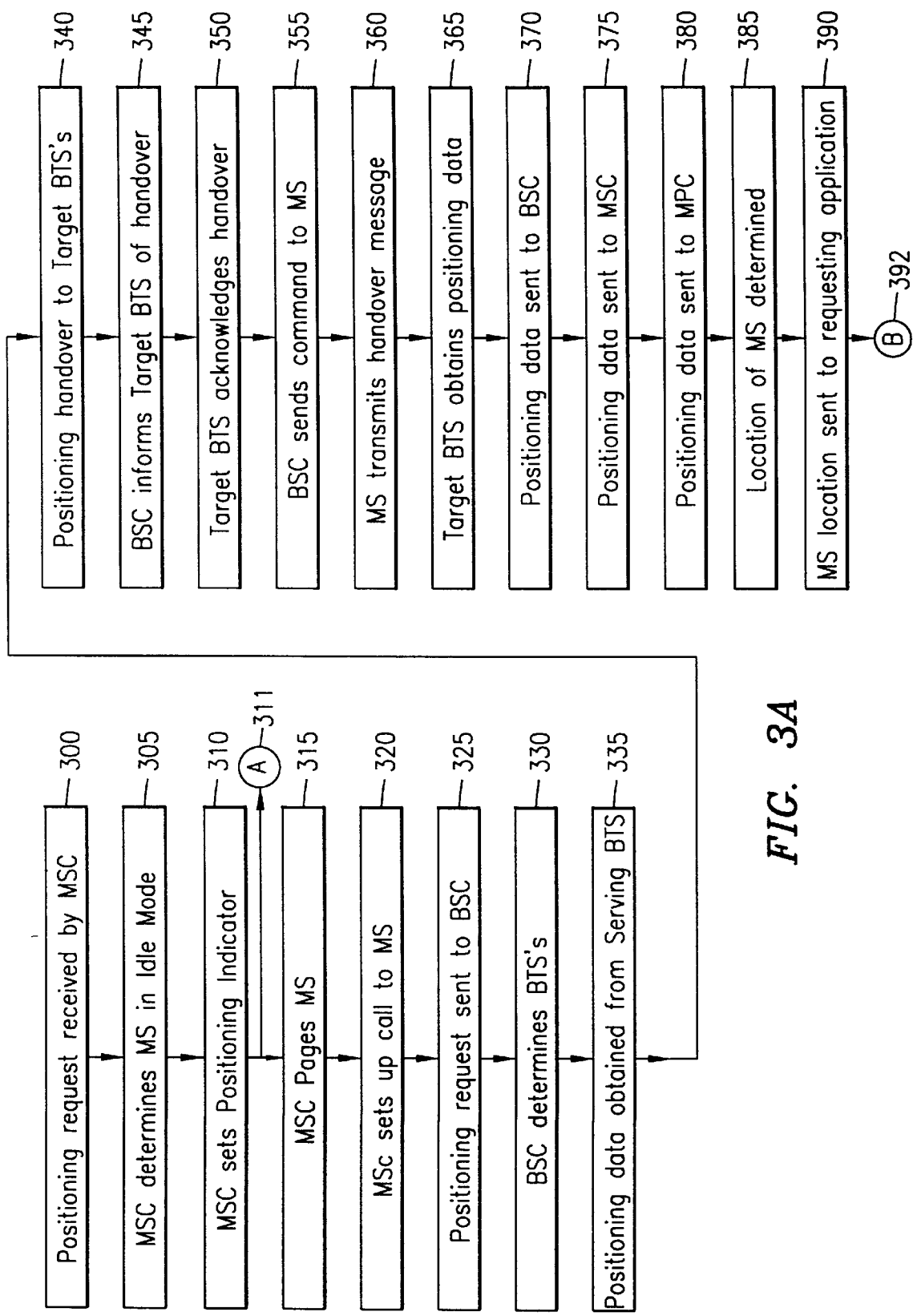
FIGS. 3A and 3B demonstrate steps in a sample positioning process of an idle mobile station in which a call is received by a serving mobile switching center during the positioning of the mobile station in accordance with preferred embodiments of the present invention.
Figure 3B:
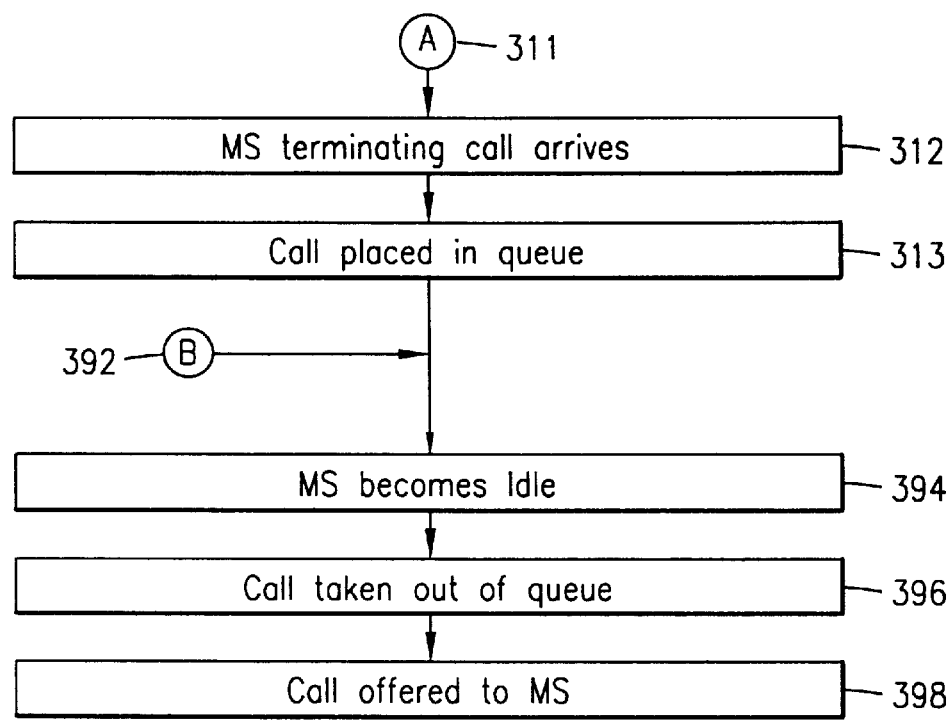

With reference now to FIGS. 3A and 3B of the drawings, steps in a sample positioning process to locate an idle Mobile Station 200 within a cellular network 10 are illustrated. Initially, after a positioning request is received by a Mobile Switching Center/Visitor Location Register (MSC/VLR) 260 (step 300) serving a Location Area (LA) 205 containing the MS 200 from a Mobile Positioning Center (MPC) 270, which could be located within the MSC/VLR 260, or could be a separate node in communication with the MSC/VLR 260, the serving MSC/VLR 260 determines that the MS 200 is in idle mode (step 305). The MSC/VLR 260 then establishes a positioning busy state associated with the MS 200, e.g., by setting a positioning indicator associated with the subscriber to "busy for connection management due to positioning" (step 310). This flag allows the MSC/VLR 260 to distinguish between a positioning connection and the normal indicator of "busy for connection management".

The MSC/VLR 260 must then page the MS 200 (step 315) and setup a call to the MS (step 320) before forwarding the positioning request to a Base Station Controller (BSC) 240 serving the LA 205 that the MS 200 is in (step 325). This call does not activate the ringing tone on the MS 200, and therefore, is not noticed by the MS 200. The originating BSC 240 then determines which Base Transceiver Station (BTS) 220 is currently serving the MS 200 (step 330), and obtains a Timing Advance (TA) value (TAl), or other positioning data, from this serving BTS 220 (step 335), if possible. Thereafter, TA values are obtained from two target BTSs (210 and 230) (step 370) by performing a positioning handover (step 340). If the serving BTS 220 does not support positioning, an additional target BTS (not shown) must be selected. It should be noted that other positioning methods based on triangulation can be used instead of obtaining TA values, as discussed herein. In addition, positioning of the MS 200 can be performed using more than three BTSs (210, 220, and 230).

The positioning handover to one of the target BTSs 230 (step 340) is accomplished by the serving BSC 240 sending a new ACTIVATION TYPE in a CHANNEL ACTIVATION message to the target BTS 230, which informs the target BTS 230 that a positioning handover needs to be performed (step 345). The target BTS 230 then acknowledges the are forwarded to the Mobile Positioning Center (MPC) 270 from the MSC 260 (step 380), where the location of the MS 200 is determined using the triangulation algorithm (step 385). The MPC 270 then presents the geographical position of the MS 200 to the requesting application (node) 280 (step 390).

In order to avoid unwanted feature interactions during the positioning of the MS 200, which was in idle mode (step 305) when the positioning request was received by the network (step 300), the MSC/VLR 260 has set a positioning indicator associated with the subscriber to "busy for connection management due to positioning" (step 310). Thereafter, as shown in FIG. 3B of the drawings (step 311), when a MS terminating call arrives in the MSC/VLR 260 (step 312), the MSC/VLR 260 can place the incoming call in a queue 265 (step 313) until the positioning process is completed (step 392) and the subscriber being positioned is put back into idle mode (step 394), e.g., the positioning indicator is turned off. Preferably, the call can be connected to a ringing tone device or an announcement machine 268 while in the queue 265 (step 314). During the positioning, the called subscriber's terminating features are not invoked. Once the positioning is finished (step 392) and the called subscriber becomes idle (step 394), the call can be taken out of the queue 265 (step 396) and offered to the MS 200 (step 398). Advantageously, by placing incoming calls in a queue 265, the MSC/VLR 260 can avoid invocation of terminating features such as call forwarding on no reply, call forwarding on busy and call waiting, as required.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the queuing of MS terminating calls is only required for positioning CHANNEL ACTIVATION message to the serving BSC 250 (step 350).

Thereafter, the BSC 240 sends a command to the MS 200 via the serving BTS 220 (step 355) to transmit a HANDOVER ACCESS message to the target BTS 230 (step 360). During the time that the MS 200 is waiting for a response from the target BTS 230, e.g., around 320 milliseconds, the target BTS 230 measures the Timing Advance value (access delay) (TA3) (step 365), using access bursts sent by the MS 200, and forwards this positioning data to the serving BSC 240 (step 370). A positioning handover can then be performed to the other target BTS 210 in the same manner as stated hereinbefore. The TA value measured by the target BTS 230 (TA3) is then transmitted by the serving BSC 250 to the MSC 260 (step 375), together with TA values (TA1 and TA2) obtained from the serving BTS 220 and other target BTSs 210.

Finally, the TA value acquired from the target BTS 230 (TA3), together with other TA values (TA1 and TA2) methods that require seizure of a traffic channel for a MS in idle mode.

It should also be noted that the flag "busy for connection management due to positioning" introduced herein can be used by other mechanisms that correct unwanted effects of positioning mobile stations in idle mode when radio contact is required in order to collect the positioning measurements.

Furthermore, it should be understood that more than one MS terminating call can be queued during the positioning of the MS. Once the MS becomes idle, the first incoming call is connected to the MS, while normal call terminating features can be applied to subsequent incoming calls, e.g., call forwarding, or call waiting, as is well known in the art.

What is claimed is:

1. A telecommunications system for preventing invocation of call terminating features for a call to a mobile terminal during positioning of said mobile terminal, said telecommunications system comprising:

a mobile switching center in wireless communication with said mobile terminal, said mobile switching center establishing a positioning busy state associated with said mobile terminal when said mobile terminal is being positioned; and a queue within said mobile switching center, said call being placed in said queue by said mobile switching center when said positioning busy state is established, said call being taken out of said queue by said mobile switching center when said mobile switching center turns off said positioning busy state, said positioning busy state being turned off when positioning of said mobile terminal is completed.

2. The telecommunications system of claim 1, wherein said positioning busy state is established by setting a positioning indicator to "busy for connection management due to positioning".

3. The telecommunications system of claim 1, wherein said call is connected to an announcement machine within said mobile switching center when said call is placed in said queue.

4. The telecommunications system of claim 1, wherein said call is connected to a ringing device within said mobile switching center when said call is placed in said queue.

5. The telecommunications system of claim 1, wherein said mobile switching center establishes said positioning busy state during positioning of said mobile terminal when said mobile terminal is in an idle mode.

6. The telecommunications system of claim 1, wherein said queue contains an additional call to said mobile terminal, said additional call being taken out of said queue when positioning of said mobile terminal is completed, said call terminating features being applied to said additional call.

7. The telecommunications system of claim 1, wherein said mobile terminal is placed in an idle mode when positioning of said mobile terminal is completed, said positioning busy state being turned off when said mobile terminal is in said idle mode.

8. The telecommunications system of claim 1, further comprising a base station system connected to said mobile switching center in wireless communication with said mobile terminal, said base station system performing positioning of said mobile terminal.

9. The telecommunications system of claim 1, wherein said call terminating features are selected from the group consisting of: call forwarding on no reply, call forwarding on busy, and call waiting.

10. A method for preventing invocation of call terminating features for a call to a mobile terminal in wireless communication with a mobile switching center during positioning of said mobile terminal, said method comprising the steps of:

establishing a positioning busy state associated with said mobile terminal, by said mobile switching center;

receiving said call by said mobile switching center, said call being placed in a queue within said mobile switching center;

positioning said mobile terminal using said mobile switching center;

turning off said positioning busy state when said step of positioning is completed; and removing said call from said queue when said positioning indicator is turned off.

11. The method of claim 10, wherein said positioning busy state is established by setting a positioning indicator to "busy for connection management due to positioning".

12. The method of claim 10, further comprising, after said step of receiving, the step of:

connecting said call to an announcement machine within said mobile switching center when said call is placed in said queue.

13. The method of claim 10, further comprising, after said step of receiving, the step of:

connecting said call to a ringing device within said mobile switching center when said call is placed in said queue.

14. The method of claim 10, further comprising, before said step of setting, the steps of:

receiving, by said mobile switching center, a positioning request from a mobile positioning center in communication with said mobile switching center; and determining, by mobile switching center, said mobile terminal is in an idle mode.

15. The method of claim 10, further comprising, before said step of turning off said positioning busy state, the step of:

receiving, by said mobile switching center, an additional call to said mobile terminal, said additional call being placed in said queue, said additional call being taken out of said queue when positioning of said mobile terminal is completed, said call terminating features being applied to said additional call.

16. The method of claim 10, wherein said mobile terminal is placed in an idle mode when positioning of said mobile terminal is completed, said step of turning off said positioning busy state being performed when said mobile terminal is in said idle mode.

17. The method of claim 10, wherein said step of positioning is performed by a base station system connected to said mobile switching center and in wireless communication with said mobile terminal.

18. The method of claim 10, wherein said call terminating features are selected from the group consisting of: call forwarding on no reply, call forwarding on busy, and call waiting.

19. A mobile switching center for preventing invocation of call terminating features for a call to a mobile terminal in wireless communication with said mobile switching center during positioning of said mobile terminal, said mobile switching center comprising:

establishing means for establishing a positioning busy state associated with said mobile terminal when said mobile terminal is being positioned using said mobile switching center;

receiving means for receiving said call; and a queue for holding said call when said positioning busy state associated with said mobile terminal is established, said call being taken out of said queue when said positioning busy state associated with said mobile terminal is turned off, said positioning busy state being turned off when positioning of said mobile terminal is completed.

20. The mobile switching center of claim 19, wherein said positioning busy state is established by setting a positioning indicator to "busy for connection management due to positioning".

21. The mobile switching center of claim 19, further comprising an annoucement machine, said call being connected to said announcement machine when said call is placed in said queue.

22. The mobile switching center of claim 19, further comprising a ringing device, said call being connected to said ringing device when said call is placed in said queue.

23. The mobile switching center of claim 19, wherein said receiving means receives an additional call to said mobile terminal, said additional call being placed in said queue, said additional call being taken out of said queue when positioning of said mobile terminal is completed, said call terminating features being applied to said additional call.

24. The mobile switching center of claim 19, wherein said call terminating features are selected from the group consisting of: call forwarding on no reply, call forwarding on busy, and call waiting.

* * * * *

UNITED STATES PATENT AND TRADEMARK OFFICE
CERTIFICATE OF CORRECTION

PATENT NO. : 5,991,620
DATED : November 23, 1999
INVENTOR(S) : Christopher H. Kingdon et al.

It is certified that error appears in the above-identified patent and that said Letters Patent is hereby corrected as shown below:

Title page,
Field [56], "Foreign Patent Documents" (1st Reference), replace "6/1902" with -- 6/1992 --

Column 1,
Line 51, replace "PLNN" with -- PLMN --

Column 2,
Line 52, replace "BTSS" with -- BTSs --

Column 4,
Line 59, add page 16, lines 1-19 of filed Application between the words "the" and "are".

Column 5,
Lines 29-49, delete "CHANNEL ACTIVATION ... together with other TA vales (TA1 and TA2)"

Signed and Sealed this

Twenty-third Day of October, 2001

Attest:

*Attesting Officer*

NICHOLAS P. GODICI
*Acting Director of the United States Patent and Trademark Office*